United States Patent [19]

Collingwood

[11] Patent Number: 4,716,657

[45] Date of Patent: Jan. 5, 1988

[54] MACHINE HAVING A SELF POWERED TOOL OR MEASURING PROBE

[75] Inventor: David Collingwood, Stonehouse, Great Britain

[73] Assignee: Renishaw plc, Gloucestershire, Great Britain

[21] Appl. No.: 915,010

[22] PCT Filed: Feb. 10, 1986

[86] PCT No.: PCT/GB86/00068

§ 371 Date: Sep. 17, 1986

§ 102(e) Date: Sep. 17, 1986

[87] PCT Pub. No.: WO86/04535

PCT Pub. Date: Aug. 14, 1986

[30] Foreign Application Priority Data

Feb. 9, 1985 [GB] United Kingdom ........... 8503355

[51] Int. Cl.$^4$ .................. G01B 7/02; B23B 51/00
[52] U.S. Cl. .................... 33/561; 33/169 R; 408/147
[58] Field of Search ............. 33/169 R, 172 E, 558, 33/561, DIG. 2; 408/147; 82/1.2

[56] References Cited

U.S. PATENT DOCUMENTS

| 3,119,288 | 1/1964 | Davis | 408/147 |
|---|---|---|---|
| 3,248,583 | 4/1966 | Kullmann et al. | 310/104 |
| 3,422,705 | 1/1969 | Nahodil et al. | 82/1.2 |
| 3,803,981 | 4/1974 | Allgeyer | 90/15 B |
| 3,946,491 | 3/1976 | Bailey et al. | 33/23 R |
| 4,077,736 | 3/1978 | Hutchens | 408/16 |
| 4,145,816 | 3/1979 | Stobbe et al. | 33/561 |
| 4,447,958 | 5/1984 | Tanaka | 33/174 L |
| 4,509,266 | 4/1985 | Cusack | 33/561 |
| 4,510,693 | 4/1985 | Cusack | 33/169 R |
| 4,536,000 | 8/1985 | Rohm | 279/1 R |
| 4,608,763 | 9/1986 | Manns et al. | 33/169 R |

FOREIGN PATENT DOCUMENTS

| 0108857 | 5/1984 | European Pat. Off. | |
| 0126195 | 11/1984 | European Pat. Off. | |
| 2502325 | 9/1982 | France | |
| 148008 | 11/1981 | Japan | 33/169 R |
| 58-90443 | 5/1983 | Japan | |
| 2084737 | 4/1982 | United Kingdom | |

Primary Examiner—Richard R. Stearns
Attorney, Agent, or Firm—Parkhurst & Oliff

[57] ABSTRACT

A machine has a movable member capable of releasably supporting a tool for performing an operation on a workpiece, and a supply of pressurized fluid. The tool includes an electric circuit which is provided with power from an electrically generator drivingly connected to a turbine driven by the machine's supply of pressurized fluid. The turbine may be in the form of a Pelton Wheel, the buckets of which are rotated by directing the pressurized fluid at them in a jet. The pressurized fluid may be a liquid or a gas. The tool may take one of several alternative forms, such as a boring bar or measuring probe.

14 Claims, 2 Drawing Figures

MACHINE HAVING A SELF POWERED TOOL OR MEASURING PROBE

BACKGROUND OF THE INVENTION

This invention relates to tools or measuring probes (hereinafter referred to collectively or individually as tools) for use with numerically controlled (NC) machine tools or with measuring machines.

Such machines have the capability of automatically substituting different types of tools in order to perform different machining or measuring operations on a workpiece. Each tool must therefore be capable of being releasably secured to the machine easily and quickly. Where a tool includes an electric circuit within its housing, a power supply has to be provided for the circuit, and this must be positioned either on the machine or within the tool and some form of releasable electrical connection has to be made between the tool and the machine. Physical electrical connections are not favored however because of the liklihood of corrosion due to the machine environment.

It is known, for example, from U.S. Pat. No. 4,145,816 to provide a battery within a tool for powering an electric circuit, and the electrical connection between the tool and the machine is made by an inductive connection. It is also known, for example, from UK Pat. No. 2,084,737 to use a battery in the tool to power an optical telemetry system for wirelessly transmitting signals from the tool to the machine.

The use of batteries however, has its drawbacks in that, at present, battery life is low, and the batteries require regular re-charging or replacement. Another problem is that ony a limited amount of power is available from the battery, particularly where the tool housing has to be small to enable it to fit into a limited amount of space. Thus for small tools requiring a relatively high power supply, a battery-powered tool may not be the best solution.

SUMMARY OF THE INVENTION

It is an object of the present invention to provide a means for supplying power to the electric circuit of a tool which overcomes or substantially diminishes these problems.

According to the present invention there is provided a machine having a movable member capable of supporting a tool for performing an operation on a workpiece and having a supply of pressurized fluid, the tool including an electric circuit and means for releasably connecting the tool to the movable member, characterized in that the tool comprises a drive means, such as a turbine which is arranged to be driven, in operation, by pressurized fluid supplied from the machine, and an electricity generator drivingly connected to the turbine for providing power to the electric circuit.

In one form of the invention the tool comprises a fluid flow duct and means for releasably connecting the fluid flow duct to the supply of pressurized fluid, the turbine being disposed in the fluid flow duct and arranged to be driven by pressurized fluid flowing, in operation, through the duct.

Alternatively the turbine is in the form of a pelton wheel, the buckets of which are rotated by directing the pressurized fluid at them in a jet.

The pressurized fluid may be liquid or gas, a supply of which may already be present on the machine.

Also according to this invention there is provided a probe for sensing a surface of an object, comprising a sensing device including an electric circuit, characterized by a fluid flow duct, and an electricity generator for powering said circuit and adapted to be driven by fluid flow passing, in operation, through said duct.

The invention is particularly of use in cases where the electric circuit in the tool has a relatively high current consumption.

BRIEF DESCRIPTION OF THE DRAWING

An example of apparatus according to this invention will now be described with reference to the accompanying drawings in which.

DESCRIPTION OF THE PREFERRED EMBODIMENT

Figure 1:
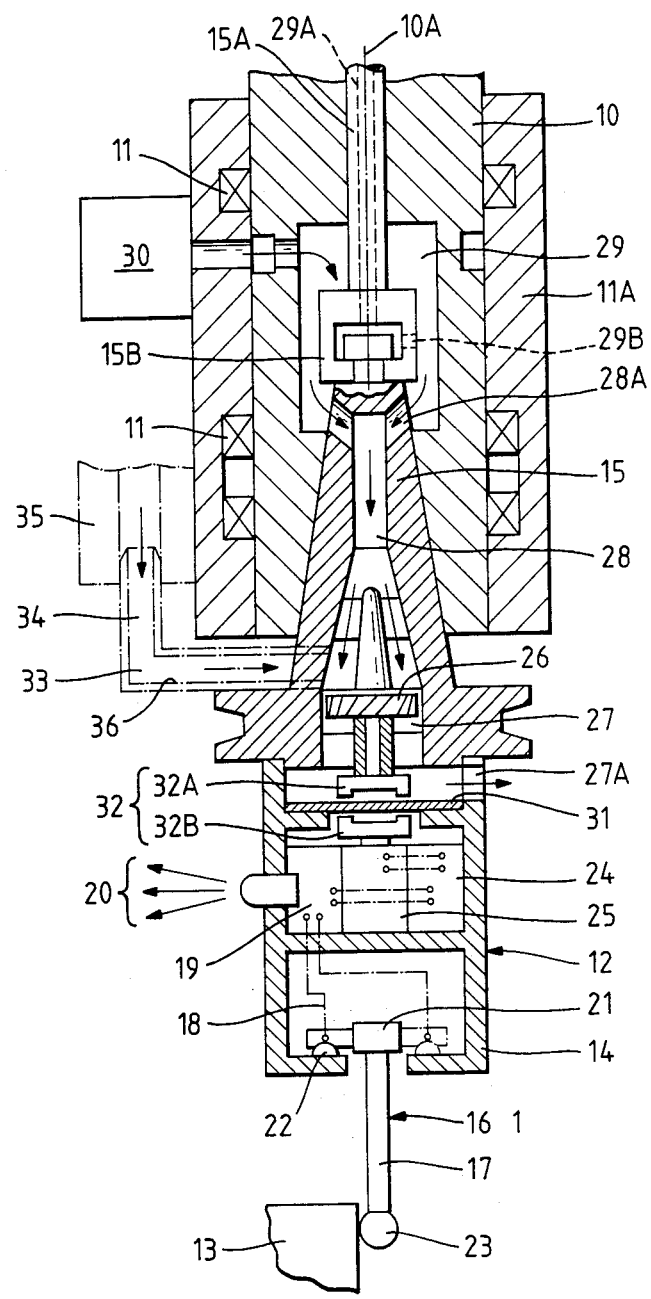
FIG. 1 is a sectional elevation of the spindle assembly of a machining centre including a measuring probe, and, FIG. 2 is a sectional elevation of an alternative form of the invention applied to a boring bar.

Referring to FIG. 1 the spindle assembly comprises a spindle 10 supported for rotation in bearings 11 in a bearing housing 11A and intended to support a tool introduced to the spindle by an automatic tool change device (not shown). The tool in this example is a probe 12 for sensing a workpiece 13 for the purpose of measuring the position thereof. It is to be understood, however, that the tool may be any one of the usual types of cutting tools used for performing machining operations on the workpiece. The spindle 10 has an axis 10A defining the direction in which the tool is removed from and introduced to the spindle.

The probe 12 comprises a housing 14 having a shank 15 for releasably securing the probe to the spindle 10. The shank is tapered and is drawn into engagement with a corresponding taper in the spindle 10 by a draw bar 15A having clamping jaws 15B, operated by an operating mechanism (not shown but well known per se) at the opposite end of the spindle 10. The housing 14 supports a surface sensing device 16 including an elongate stylus 17, an electric circuit 18 and a signalling device 19 adapted to produce an optical signal 20. One end of the stylus 17 is supported in the housing 14 by electrical contacts 22 provided in the circuit 18. The other end, 23, of the stylus is free for engagement with the workpiece 13. Such engagement, which is produced by relative movement of the spindle and the workpiece, displaces the stylus from a rest position on the contacts 22 thereby breaking the circuit 18 and producing the signal 20 indicating that the surface of the workpiece has been sensed. The circuit 18 and the signalling device 19 are powered by a battery 24 arranged in the housing 14.

The battery 24 is adapted to be charged, or for its charge to be maintained, by a rotary generator 25 acting through a charge control unit (not shown). The generator 25 is driven by a turbine 26 arranged in a turbine flow duct 27 connected to a supply duct 28 provided in the shank 15. The duct 28 has inlets 28A from a duct 29 provided in the spindle 10, and the latter duct is connected to an air compressor 30 mounted on the bearing housing 11A. Compressed air supplied by the compressor 30 reaches the turbine 26 through the ducts 28,29 to drive the turbine and thus drive the generator 25. To avoid contamination of the electrical components by the fluid, the duct 27 is separated from the generator 25 by a partition 31 of non-magnetic material, and the generator 25 is coupled to the turbine across the partition by a magnetic coupling 32 having elements 32A,32B situated at opposite sides of the partition 31. The duct 27 has an outlet 27A for the air which may be ducted toward the stylus 17 to provide a cleaning flow of air over the surface to be measured.

In many machine tools a source of compressed air is already provided for cleaning the tapered shank 15 of the tool 12 immediately prior to clamping the shank taper into the spindle taper with the draw bar 15A. The compressed air is supplied through the draw bar in the centre of the spindle along a duct illustrated in dotted lines at 29A. This air supply can form an alternative supply of pressurized fluid to the turbine 26, the only modification which is required of the machine tool being the provision of an aperture or apertures 29B in the jaws 15B of the draw bar to ensure that the air passes into the duct 29. This alternative will also avoid the requirement for sealing the spindle against loss of air pressure since the fit between the tapered shank and the spindle taper will provide an effective air seal.

It will be appreciated that the spindle 10, while being rotatable for the purpose of driving rotary cutting tools, is usually held against rotation for the measuring operation.

In a modification, the probe 12 is provided with a radial extension 33 having a portion 34 extended parallel to the axis 10A and adapted to engage a socket 35, provided on the housing 11A, when the probe is introduced to the spindle 10. The socket is connected to the compressor 30 and the extension 33 and portion 34 define a duct 36 leading to the turbine flow duct 27 to feed compressed air thereto. In this modification the duct 28 in the shank 15 is dispensed with and the turbine is driven by flow through the duct 36.

However, most machine tools provide a supply of liquid lubricant for the cutting process and generally this supply is provided close to the end of the spindle. In these circumstances the socket 35 to which the extension portion 34 connects may communicate with a supply of liquid under pressure, and this would provide a greater source of energy for the turbine 26.

Figure 2:
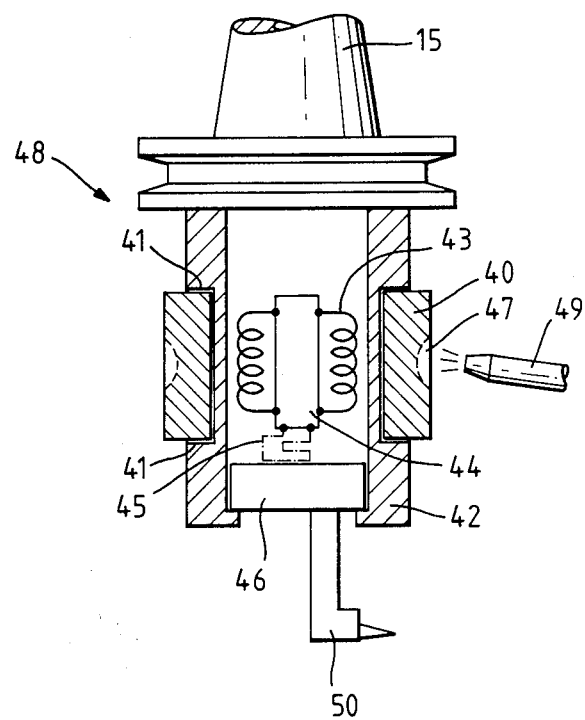

FIG. 2 illustrates diagrammatically a further alternative method of generating electricity at the tool itself. In this embodiment a collar 40, including an annular multi-pole magnet, is mounted for rotation on bearing surfaces 41 on the outside of the housing 42 of the tool 48. A coil or coils 43 are provided on the inside of the housing for generating electricity to charge a battery 44 within the tool for powering an electrical circuit 45 which drives an electric motor 46 within the tool housing.

A turbine in the form of a Pelton Wheel is provided around the outer periphery of the collar. The Pelton Wheel has buckets 47 which can be driven by directing a supply of pressurized fluid onto them. A convenient source of pressurized fluid would be the nozzles which provide cutting liquid, as shown at 49, which are normally available on a machine tool. This arrangement allows for electricity generation by the tool without any modification of the existing machine tool design.

In this illustration the tool is a boring bar having a cutter 50 the position of which is capable of being adjusted transversely to the spindle axis by means of the electric motor, as is known per se, to vary the diameter of a hole which may be bored in a workpiece.

Still further alternative embodiments of this invention are possible. For example a magnetic collar could be mounted for rotation within the housing, or axially on one end of the tool, and suitable integral turbine blades of any convenient type can be provided on it. The electricity generating coil or coils would be appropriately positioned to generate electricity from the rotation of the magnet. The fluid used to drive the turbine on the collar may then be supplied externally or internally as described hereinbefore. Alternatively, the collar may simply support a bar or cruciform magnet rather than itself being a magnet.

The invention may be applied to a machine tool in which the spindle is axially extendible in addition to being rotatable but in such machine tools the provision of pressurized fluid at the tool involves significantly more difficult sealing problems for the machine tool designer if continuous operation of the turbine is required while the spindle is moving axially.

It will also be understood that in some forms of tooling the circuit may have to be kept live even when the tool is stored, in which case the battery as described in both embodiments is essential. However, where this is not the case the battery may be eliminated and the probe made live by the flow of pressurized fluid passing through the turbine and generating sufficient current to power the circuit.

It will also be understood that the embodiment of the invention described in FIG. 2 as applied to a boring bar could be applied to any other form of tool including the measuring probe of FIG. 1, and that the embodiment described in FIG. 1 as applied to a measuring probe could be applied to any other tool including the boring bar of FIG. 2.

I claim:

1. A machine having a movable member (10) capable of supporting a tool for performing an operation on a workpiece and having a supply (29A,30,35,49) of pressurized fluid, a tool (12,48) including an electric circuit (18,45), and means (15) for releasably connecting the tool to the movable member, characterized in that the tool comprises a drive means (26,47) which is arranged to be driven, in operation, by pressurized fluid supplied from the machine, and an electricity generator (25,43) drivingly connected to the drive means for providing power to the electric circuit.

2. A machine according to claim 1 and wherein the tool comprises a fluid flow duct (28,27;36,27), means (15,34) for releasably connecting the fluid flow duct with the supply of pressurized fluid (29A,30,35), the drive means (26) being disposed in the fluid flow duct and arranged to be driven by the pressurized fluid which flows, in operation, through the duct.

3. A machine according to claim 2 and wherein the electric circuit (18) is contained within a housing (14) of the tool which is separated from the fluid flow duct by a non-magnetic partition (31) and the generator (25) is coupled to the drive means by a magnetic coupling (32) having parts (32A,32B) situated at opposite sides of the partition.

4. A machine according to claim 2 and wherein the pressurized fluid is supplied to the fluid flow duct (28, 27) in the tool through a further duct (29A) passing through a spindle (10) of the machine.

5. A machine according to claim 2 and wherein the tool has an extension (33) which forms part of the fluid flow duct and includes means (34) adapted to engage a connector (35) provided on the machine and through which the pressurized fluid is supplied to the tool.

6. A machine according to claim 1 wherein said drive means is a turbine.

7. A machine according to claim 6 and wherein the turbine (25) is an axial flow turbine.

8. A machine according to claim 6 and wherein the turbine is a Pelton Wheel (47).

9. A machine according to claim 8 and wherein the electricity generator comprises a magnet (40) supported for rotation with the Pelton Wheel and a coil (43) which is connected to the electric circuit to provide electrical power thereto.

10. A machine according to claim 1 and wherein the tool includes a battery (24,44) connected to the electric circuit and the generator is connected to the battery.

11. A machine according to claim 1 and wherein the tool is a measuring probe (12).

12. A machine according to claim 1 and wherein the tool is a boring bar (48).

13. A measuring probe for sensing a surface of an object comprising a sensing device (16) including an electric circuit (18), characterized by a fluid flow duct (28,27;36,27), a turbine (26) arranged to be driven, in operation, by pressurized fluid flowing through said duct and an electricity generator (25) for powering said electric circuit and which is drivingly connected to the turbine.

14. A boring bar for performing cutting operations on a workpiece comprising a cutter (50), an electric motor (46) for moving the cutter transversely to the axis of the boring bar and an electric circuit (45) for driving the motor, characterized by an electricity generator comprising a magnet (40) mounted for rotation, a turbine (47) for rotating the magnet and adapted to be driven by pressurized fluid acting thereon, and a coil arranged to generate electricity when the magnet rotates, the coil being connected to the electric circuit to provide power therefor.

* * * * *